(12) United States Patent
Nakagawa

(10) Patent No.: US 8,736,870 B2
(45) Date of Patent: May 27, 2014

(54) PRINT CONTROL APPARATUS AND METHOD

(75) Inventor: Yuuko Nakagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 523 days.

(21) Appl. No.: 12/779,836

(22) Filed: May 13, 2010

(65) Prior Publication Data

US 2010/0309495 A1 Dec. 9, 2010

(30) Foreign Application Priority Data

Jun. 4, 2009 (JP) .................................. 2009-135335

(51) Int. Cl.
*H04N 1/40* (2006.01)
(52) U.S. Cl.
USPC .......................................... 358/1.15; 358/468
(58) Field of Classification Search
USPC .......... 358/1.9, 2.1, 1.15, 468, 400, 500, 406, 358/504
See application file for complete search history.

(56) References Cited

U.S. PATENT DOCUMENTS

| | | | | |
|---|---|---|---|---|
| 7,708,861 B2 * | 5/2010 | Hook et al. | .................... | 162/135 |
| 2012/0113176 A1 * | 5/2012 | Folkins et al. | .................. | 347/10 |
| 2012/0200654 A1 * | 8/2012 | Arrington et al. | ............ | 347/171 |

FOREIGN PATENT DOCUMENTS

| | | | |
|---|---|---|---|
| JP | S60-012460 A | | 1/1985 |
| JP | 03-003797 A | | 1/1991 |
| JP | H07-096198 A | | 4/1995 |
| JP | H08-047891 A | | 2/1996 |
| JP | 09-011192 A | | 1/1997 |
| JP | 11-262893 A | | 9/1999 |
| JP | 2000-084891 A | | 3/2000 |
| JP | 2000132632 A | * | 5/2000 |
| JP | 2000-168964 A | | 6/2000 |
| JP | 2001-146053 A | | 5/2001 |
| JP | 2001-187471 A | | 7/2001 |
| JP | 2001-225298 A | | 8/2001 |
| JP | 2002-254756 A | | 9/2002 |
| JP | 2003-002521 A | | 1/2003 |
| JP | 2003-326782 A | | 11/2003 |
| JP | 2004-090131 A | | 3/2004 |
| JP | 2005-242814 A | | 9/2005 |
| JP | 2005-262810 A | | 9/2005 |
| JP | 2006-015643 A | | 1/2006 |
| JP | 2006-102987 A | | 4/2006 |
| JP | 2007-326184 A | | 12/2007 |
| JP | 2008-040313 A | | 2/2008 |

* cited by examiner

*Primary Examiner* — Thomas D Lee
*Assistant Examiner* — Stephen M Brinich
(74) *Attorney, Agent, or Firm* — Canon USA Inc IP Division

(57) ABSTRACT

Whether or not an execution of a print job according to a designated print setting is available is decided based on a result of an output of a sensor of a temperature and humidity. When the print job cannot be executed, an alternative setting is decided and the print job is executed based on the alternative setting. Thus, whether or not the execution of the print job according to the designated print setting is available can be decided based on the output of the temperature/humidity sensor provided for a printing apparatus.

18 Claims, 7 Drawing Sheets

PRINT CONTROL APPARATUS AND METHOD

BACKGROUND OF THE INVENTION

1. Field of the Invention

The present invention relates to print control apparatus and method for allowing a printing apparatus to execute printing based on a print setting set by the user.

2. Description of the Related Art

In the related arts, when a printing apparatus is allowed to execute printing, the user makes a print setting such as a size of paper or the like and, thereafter, instructs the printing. If the printing apparatus is a printer using roll paper, a cutting instruction for instructing so as to automatically cut the roll paper after printing is also included in the print setting.

Such a technique that a temperature sensor and a humidity sensor are provided for the printing apparatus and a change in image quality based on a detection result of the sensor is reflected to a preview has also been known (refer to Japanese Patent Application Laid-Open No. 2005-242814).

In the printing apparatus which prints onto the roll paper, on the other hand, if the automatic cutting of the roll paper is included in the print setting as mentioned above, the printing apparatus executes the printing and, thereafter, cuts the roll paper at an instructed position. In this instance, depending on the temperature or humidity upon printing, there is a case where the paper should not be cut at the instructed cutting position due to a weight of roll paper after the cutting, an influence of static electricity, or the like.

However, in the related arts, the user could not know such a fact. There is, consequently, a case where a print result which is not intended by the user is obtained.

SUMMARY OF THE INVENTION

It is one aspect of the invention to eliminate such a problem as mentioned above.

Another aspect of the invention is to enable whether or not an execution of a print job by a designated print setting is available to be determined based on an output of a thermo-hygro sensor provided for a printing apparatus.

Still another aspect of the invention is to restrict an execution of the printing based on a print setting which should not be executed in the printing apparatus.

Further features of the present invention will become apparent from the following description of exemplary embodiments with reference to the attached drawings.

DESCRIPTION OF THE EMBODIMENTS

An embodiment of the invention will be described in detail hereinbelow with reference to the drawings. A construction illustrated in the following embodiment is nothing but an example and the invention is not limited by the illustrated construction.

Figure 1:
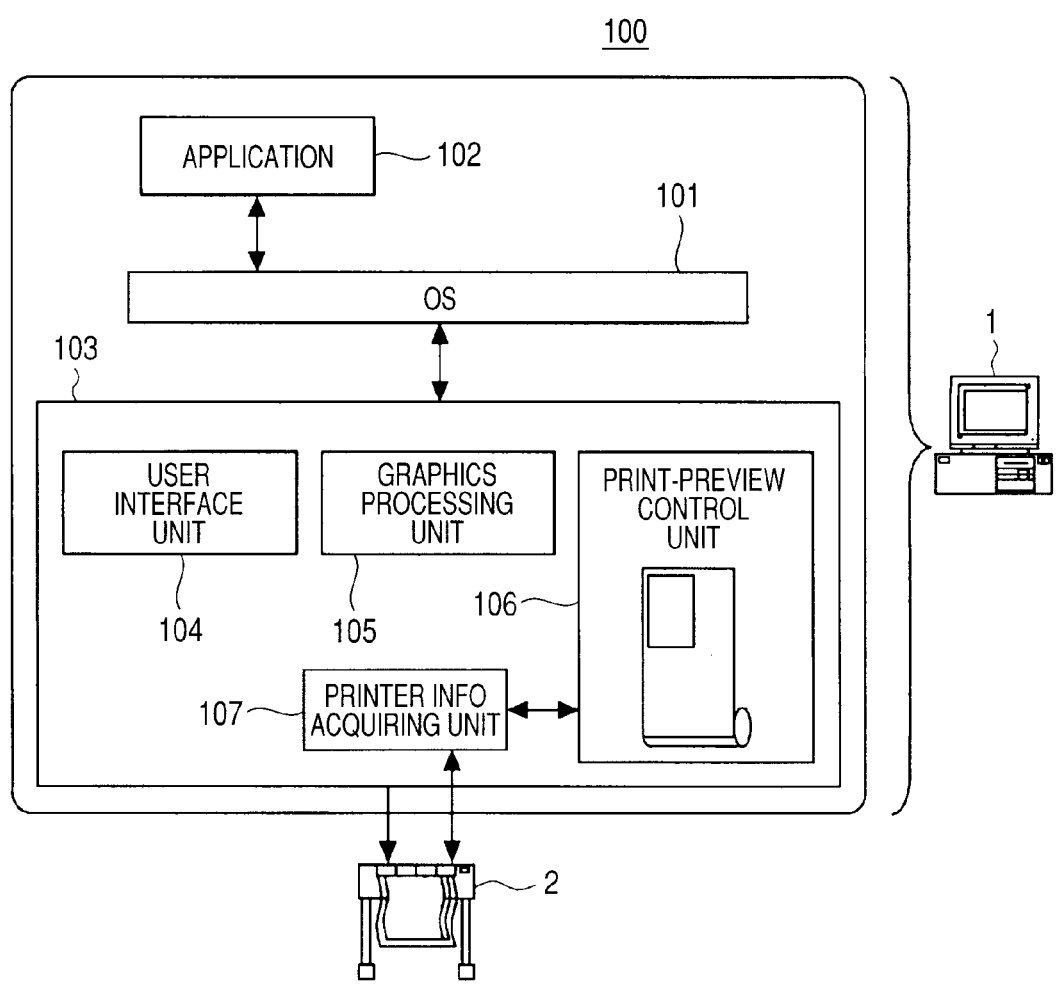
FIG. 1 is a block diagram illustrating a print system 100 according to an embodiment of the invention.

FIG. 1 is a block diagram illustrating a schematic construction of a print system 100 including a host apparatus 1 and a printing apparatus (printer) 2 as an example of a print control apparatus according to the invention.

The host apparatus 1 can be realized by a personal computer (PC) or the like. An operating system (hereinbelow, abbreviated to OS) 101, an application 102, and a printer driver 103 have been installed in the host apparatus 1. The printer driver 103 is software for controlling the printer 2. The application 102 forms various kinds of documents. In the host apparatus 1, when the document formed by the application 102 is printed, the printer driver 103 is called through a print menu of the application 102. Transmission and reception of information between the application 102 and the printer driver 103 are performed through the OS 101.

The printer driver 103 includes a user interface unit 104, a graphics processing unit 105, a print-preview control unit 106, and a printer information acquiring unit 107. The printer driver 103 converts the document formed by the application 102 into a print command and image data which can be interpreted by the printer 2 and transmits them as a print job to the printer 2. The printer 2 receives the print job and prints an image based on the image data onto a recording medium such as roll paper.

The user interface unit 104 provides a display screen to be presented to the user and receives an input from the user based on the display screen. The graphics processing unit 105 forms print data which is sent to the printer 2. The print-preview control unit 106 controls a print-preview for confirming a print layout or the like. The printer information acquiring unit 107 acquires various kinds of printer information such as information on a width of roll paper set in the printer 2, a present state of the printer 2, and the like.

Figure 2:
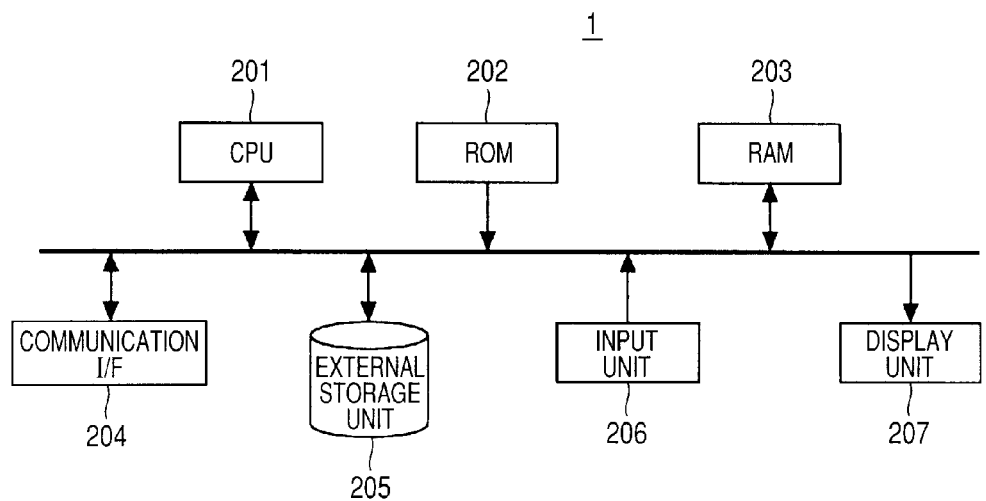
FIG. 2 is a block diagram illustrating a construction of a host apparatus 1.

FIG. 2 is a block diagram illustrating a construction of the host apparatus 1.

The host apparatus 1 has a CPU 201, a ROM 202, a RAM 203, a communication I/F 204, an external storage unit 205, an input unit 206, a display unit 207, and a bus which connects them.

The CPU 201 makes various kinds of control of the whole host apparatus 1. An initializing program which is executed by the CPU 201 upon activation of the host apparatus 1 and various kinds of data have been stored in the ROM 202. The RAM 203 is used as a work area of the CPU 201 or stores various kinds of set values.

The external storage unit 205 is constructed by, for example, a hard disk drive (HDD) or the like. Various kinds of programs have been stored in the external storage unit 205. The RAM 203 stores a program for realizing processes shown in flowcharts, which will be described hereinafter. Such a program is loaded from the external storage unit (HDD) 205. The input unit 206 is constructed by a keyboard, a mouse, or the like and inputs various kinds of instructions from the user to the CPU 201. The display unit 207 is constructed by an LCD, a CRT, or the like and displays various kinds of information under control of the CPU 201. The communication I/F 204 communicates print job data and control signals with peripheral apparatuses such as a printer 2 and the like.

Figure 8:
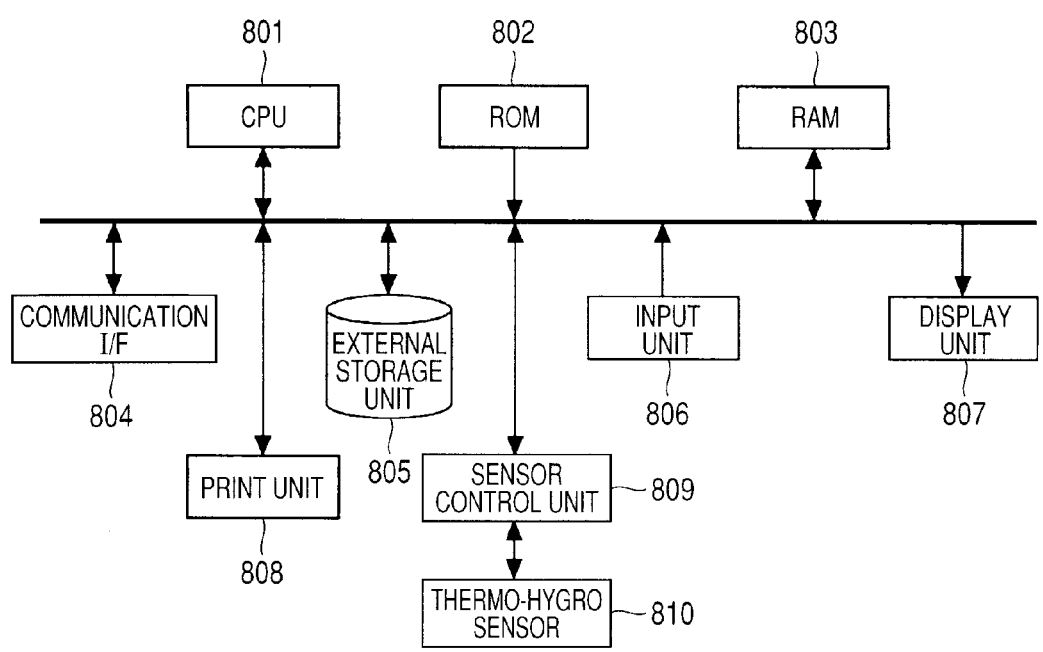
FIG. 8 is a block diagram illustrating a construction of the printer 2.

FIG. 8 is a diagram illustrating a construction of the printer 2. In FIG. 8, a CPU 801 makes various kinds of control of the whole printer 2. An initializing program which is executed by the CPU 801 upon activation of the printer 2, various kinds of programs for controlling the operation of the printer 2, and various kinds of data have been stored in a ROM 802. A RAM 803 is used as a main memory or a work area for the CPU 801.

The external storage unit 805 is constructed by, for example, a hard disk drive (HDD) or the like. Various kinds of programs for controlling the operation of the printer 2 have been stored in the external storage unit 805. The external storage unit 805 stores data (including image data and a print command) of a job received from the host apparatus 1. The RAM 803 stores the program for realizing the processes shown in the flowcharts of FIGS. 5 and 6, which will be described hereinafter. Such a program is loaded from an external storage unit (HDD) 805. An input unit 806 is constructed by a plurality of buttons and inputs various kinds of instructions from the user to the CPU 801. The RAM 803 stores image data which is transferred to a print unit 808. A display unit 807 is constructed by an LCD or the like and displays various kinds of information under control of the CPU 801. A touch panel or the like constructed by integrating the input unit 806 and the display unit 807 may be used. A communication I/F 804 communicates job data and control signals with the host apparatus 1.

Further, the printer 2 has the print unit 808 for printing an image received from the host apparatus onto a recording medium such as roll-shaped recording paper by an ink jet system. The print unit 808 has a roll paper feeding unit and prints the image of an arbitrary length within a range permitted by the printer driver onto the roll paper which is fed from the roll paper feeding unit. The print unit 808 also has a cutter apparatus. After the image was printed onto the roll paper, the roll paper can be automatically cut by the cutter apparatus. There is a minimum cut length adapted to cut the roll paper by the cutter apparatus of the print unit 808. When a length of image whose printing has been instructed is shorter than the minimum cut length, a margin is provided at a lower edge and the roll paper is cut by the minimum cut length. The print unit 808 also has a feeding unit for cut paper and can print not only onto the roll paper but also onto the cut paper.

The printer 2 has a sensor for detecting a temperature and humidity around the printer and a sensor control unit 809 to which the sensor has been connected. A thermo-hygro sensor (temperature/humidity sensor) 810 is a sensor for detecting environment information around the printer 2. Specifically speaking, it is a sensor for detecting an atmospheric temperature and humidity. The sensor control unit 809 controls the thermo-hygro sensor 810 and transfers the detected temperature and humidity to the CPU 801. The thermo-hygro sensor 810 may be replaced by a sensor for detecting only the temperature or a sensor for detecting only the humidity. The minimum cut length is changed according to a result detected by the thermo-hygro sensor 810. Since a weight of cut sheet or an influence by the static electricity changes due to an influence of the temperature or humidity, if the sheet is dried and its weight decreases, the minimum cut length is increased. Since there is also a possibility that the roll paper is damaged depending on the result detected by the thermo-hygro sensor 810, there is also a case where the automatic cutting by the cutter apparatus is inhibited.

The CPU 801, ROM 802, RAM 803, communication I/F 804, external storage unit 805, input unit 806, display unit 807, print unit 808, and sensor control unit 809 are mutually connected through a bus.

Subsequently, a print-preview displaying procedure using the print-preview control unit 106 according to the operation of the user will be described.

When the user forms a desired document by the application 102 and instructs the printing from a menu or the like provided for the application 102, a print dialog of the printer 2 is displayed. From the print dialog provided for the application 102, by pressing a property button or the like, the setting of the selected printer driver 103 can be confirmed or changed.

Figure 3:
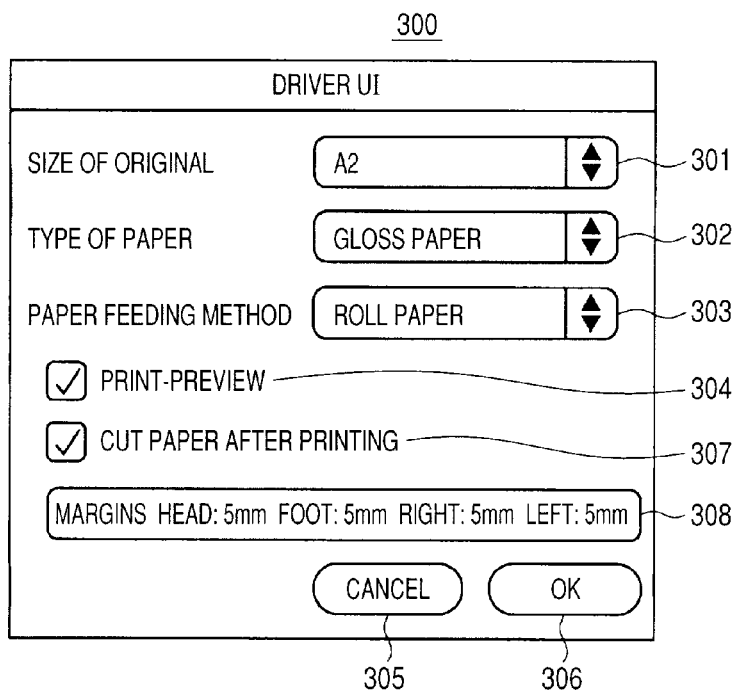
FIG. 3 illustrates a user interface 300 for performing a confirmation or the like of a setting of a printer driver.

FIG. 3 is a diagram illustrating a user interface 300 for confirming or changing the setting of the printer driver. This display screen is formed by the user interface unit 104.

In FIG. 3, a listbox 301 is provided to designate a size of original. A document as a print target is supplied from the application 102 to the printer driver 103 according to the original size designated here. A listbox 302 is provided to designate a type of paper. The printer 2 is allowed to execute the printing by the paper of the type designated here. A listbox 303 is provided to designate a paper feeding method. The printer 2 is allowed to feed the paper by the paper feeding method designated here. There are roll paper and cut paper as for the paper feeding method. A checkbox 304 is provided to designate whether or not the print-preview is executed. If the checkbox 304 has been checked, the print-preview is executed prior to allowing the printer 2 to execute the printing. A checkbox 307 is provided to allow the printer 2 to cut the paper after printing. The checkbox 307 is validated when the paper feeding method corresponds to the roll paper. If the checkbox 307 has been checked, the printer 2 automatically cuts the paper after printing was executed. When a cancel button 305 is pressed, the contents designated here are cancelled and this display screen is closed. When an OK button 306 is pressed, the process is executed according to the contents designated here. A display unit 308 displays a margin amount upon printing. The printer 2 executes the printing of the image in a state where the margins designated here are provided. The cutter apparatus of the print unit 808 cuts the roll paper at the position corresponding to the margin amount of the foot edge designated here.

When the OK button 306 is pressed in the state where the foregoing setting has been made, the setting is determined, the display screen of FIG. 3 is finished, and the contents set here are sent to the printer 2. When the checkbox 304 has been checked, the display screen is shifted to a display screen of FIG. 4. If the checkbox 304 is not checked, the display screen is returned to the print dialog of the application 102. By pressing control of a print start button or the like from the print dialog, document data is sent from the application 102 to the printer driver 103 and a print job is formed. After that, the print job is sent to the printer 2.

Figure 4:
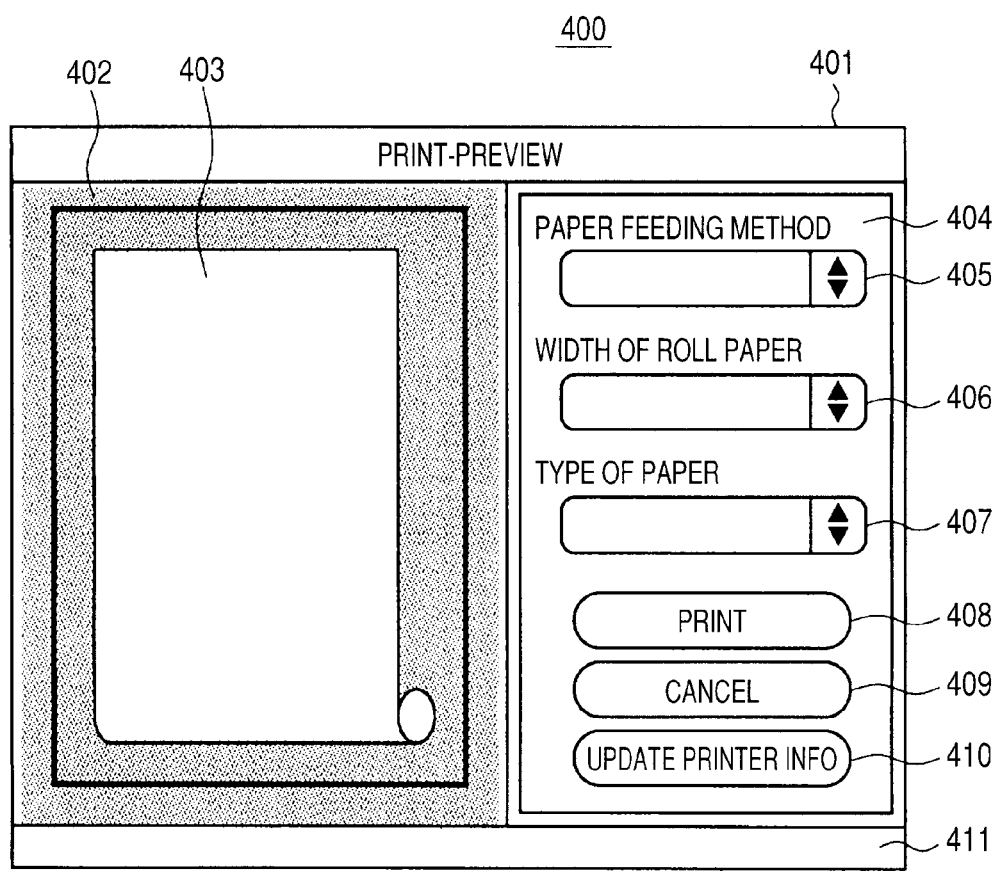
FIG. 4 is a diagram illustrating a user interface 400 for displaying a print-preview.

FIG. 4 is a diagram illustrating a user interface 400 through which the print-preview control unit 106 displays a print-preview.

In FIG. 4, a print-preview dialog 401 includes a print-preview display unit 402 and a print setting display unit 404. A paper image 403 is a diagram illustrating a state of the paper upon printing. By the paper image 403, the user can confirm at which position on the paper the document as a print target is arranged. FIG. 4 illustrates an example of a case where the roll paper is used. As illustrated in this example, since the winding position of the paper is known from the paper image 403, the user can also determine how the image is arranged for a sheet discharging direction. A listbox 405 is provided to display the paper feeding method designated in FIG. 3. A listbox 406 is provided to display a width of roll paper according to the original size designated in FIG. 3. A listbox 407 is provided to display a type of paper designated in FIG. 3. The contents displayed in the listboxes 405 to 407 can be changed by the operation by the user. By changing them, the changed contents are reflected to the display contents on the print-preview display unit 402 in association with them.

When a print button 408 is pressed, the print setting designated here is determined. The contents designated here and the document data are sent to the printer 2 and the printing is executed. When a cancel button 409 is pressed, the display screen of FIG. 4 is closed and the display screen is returned to the display screen of FIG. 3. When a button 410 is pressed, various kinds of information of the printer 2 is acquired through the printer information acquiring unit 107. For example, when the button 410 is pressed, if the roll paper corresponding to the original size or the paper type designated in FIG. 3 is not included as roll paper set in the printer 2, the contents of the dialogs 406 and 407 are changed to the contents set in the printer 2 at present. When the display screen of FIG. 4 is displayed first, even if the button 410 is not pressed, the information of the present printer 2 is acquired. An area 411 is an area to display various kinds of messages to be notified to the user.

Figure 5:
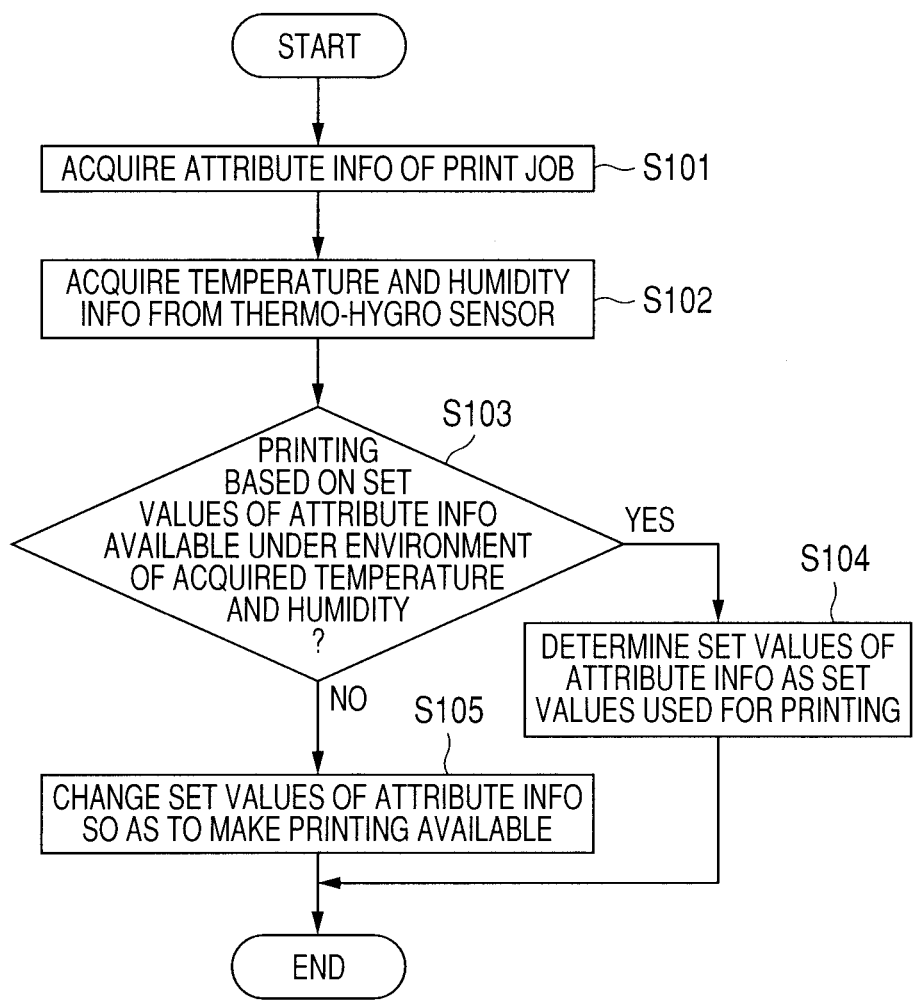
FIG. 5 is a flowchart illustrating a process for determining environment information of a printer 2.

FIG. 5 is a flowchart illustrating a flow for a process in the printer 2. The flowchart of FIG. 5 is stored in the ROM 802 of the printer 2 and is executed by the CPU 801 of the printer 2.

When the print job is received from the host apparatus 1 in S101, the printer 2 acquires attribute information (print setting designated on the display screen of FIG. 3) of the received print job and stores it into the RAM 803. Besides the print setting (the paper size width, paper type, and the like of the print job) designated on the display screen of FIG. 3, information which specifies the print job and the like are included in the attribute information. In the print setting here, it is assumed that the setting as illustrated in FIG. 3 has been made.

Subsequently, in S102, the sensor control unit 809 acquires the present temperature and humidity information from the thermo-hygro sensor 810 attached to the printer 2. In S103, whether or not the printing based on the set values set by the attribute information is available is determined from the attribute information of the print job and the temperature and humidity. Specifically speaking, whether or not the printing based on the setting is available is determined from the minimum cut length that is decided according to the present temperature and/or humidity, the size of image according to the print job, and the margin amounts. Further, whether or not the automatic cutting by the cutter apparatus based on the present temperature and/or humidity is available is determined. The determination here includes not only the determination about whether or not the execution of the printing is available but also the determination about whether or not the printing should be executed. Although the cutting by the cutter apparatus is such a process that even in the case where the printing should not be executed due to the temperature and/or humidity, it can be also forcedly executed, in the determination here, it is determined that the printing which should not be executed is not available.

If it is decided in S103 that the printing is available, the processing routine advances to S104 and the set values set in the attribute information are determined as set values which are actually used for printing. If it is decided in S103 that the printing is not available, S105 follows. In S105, the set values based on which the execution of the printing is not available under the acquired temperature and humidity environment are changed so as to make the printing available. Specifically speaking, when the length based on the image size according to the print job is shorter than the minimum cut length, the margin amount at the foot edge is changed to the minimum cut length. If the printing should not be executed due to the temperature and/or humidity, the setting of the automatic cutting is invalidated. The changed set values are stored as an alternative setting into the RAM 803.

Subsequently, a preview process will be described.

Figure 6:
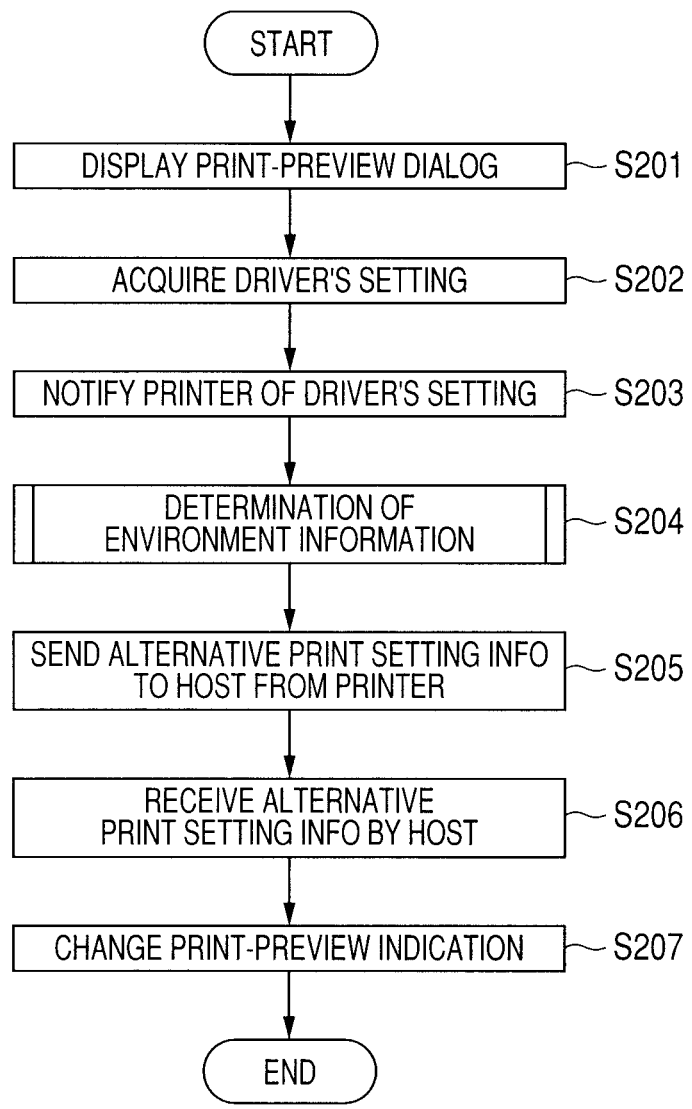
FIG. 6 is a flowchart illustrating an outline of a preview process.

FIG. 6 is a flowchart illustrating an outline of the preview process. This flowchart relates to a process which is executed by the host apparatus 1 and the printer 2 in an interlocking relational manner. The processes in S201, S202, S203, S206, and S207 in FIG. 6 are executed by the CPU 201 of the host apparatus 1 and the processes in S204 and S205 are executed by the CPU 801 of the printer 2.

First, in S201, when the OK button 306 is pressed on the display screen of FIG. 3, the print-preview dialog 401 is displayed. Subsequently, in S202, the setting of the printer driver is acquired from the user interface unit 104. It is now assumed that the setting of the printer driver which is acquired here is the setting according to the contents as illustrated in FIG. 3. It is also assumed that the display contents on the print-preview display unit 402 are the contents according to the contents designated in FIG. 3.

Subsequently, when the print button 408 is pressed, the acquired setting of the printer driver is notified to the printer 2 in S203. The processing routine advances to a determination about the environment information in step S204. The determination about the environment information is as already described by using FIG. 5.

In the determination in S204, it is determined in S103 that the execution of the printing is not available and it is assumed that the alternative setting has been decided. As an alternative setting, it is assumed that such a setting that the margin amount at the foot edge was changed from 5 mm to 20 mm and the setting adapted to cut the paper after printing was invalidated has been determined.

Subsequently, in S205, the printer 2 transmits the information of the alternative setting decided in S204 to the host apparatus 1. In this instance, information indicative of the foot margin of 20 mm and information showing that the setting adapted to cut the paper after printing has been invalidated are transmitted to the host apparatus 1. In this case, as an alternative setting, only the necessary information (changed information) may be transmitted or all information including other print settings may be transmitted. In the case where it is decided in S103 that the execution of the printing is available and the alternative setting is not formed, when the print button 408 is pressed, the printing is executed by the printer 2 without sending the print setting to the host apparatus 1.

Subsequently, in S206, the host apparatus 1 receives the alternative setting and stores it into the RAM 203. In S207, the print-preview control unit 106 changes the contents of the print-preview display unit 402 based on the received alternative setting. That is, since the margin amount at the foot edge was changed, the print-preview is changed so that such a change can be identified. Further, a message showing that the cut setting has been invalidated is displayed in the area 411. When the print button 408 is pressed in this state, the printer 2 executes the printing and stops at timing when the roll paper has been conveyed by the length that is equal to the changed margin amount. After that, the user cuts the roll paper by the manual operation. In the case of manually cutting the roll paper, since there is no need to consider an influence of the temperature and/or humidity, the user does not need to cut it at the position of the margin of 20 mm. Therefore, there will be no problem even if the roll paper is cut at the designated initial position of the margin of 5 mm. After the roll paper was cut, since the roll paper is rewound, even if the roll paper is conveyed by the distance of 20 mm, no inconvenience will occur.

To validate the cut setting, it is sufficient that the user temporarily presses the cancel button 409, returns the display screen to the display screen of FIG. 3, sets the margin at the foot edge to 20 mm (such a process may be automatically executed according to the received alternative setting), and newly checks the checkbox 307. When the OK button is pressed in this state and the print button 408 is pressed on the display screen of FIG. 4, the margin at the foot edge is set to 20 mm, the printing is executed, and the automatic cutting of the roll paper is executed.

The reason why the print-preview is displayed as shown in S207 is to notify the user that the print setting differs from the print setting which was initially designated by the user. It is also restricted that the printer 2 executes the printing based on the improper print setting.

Figure 7:
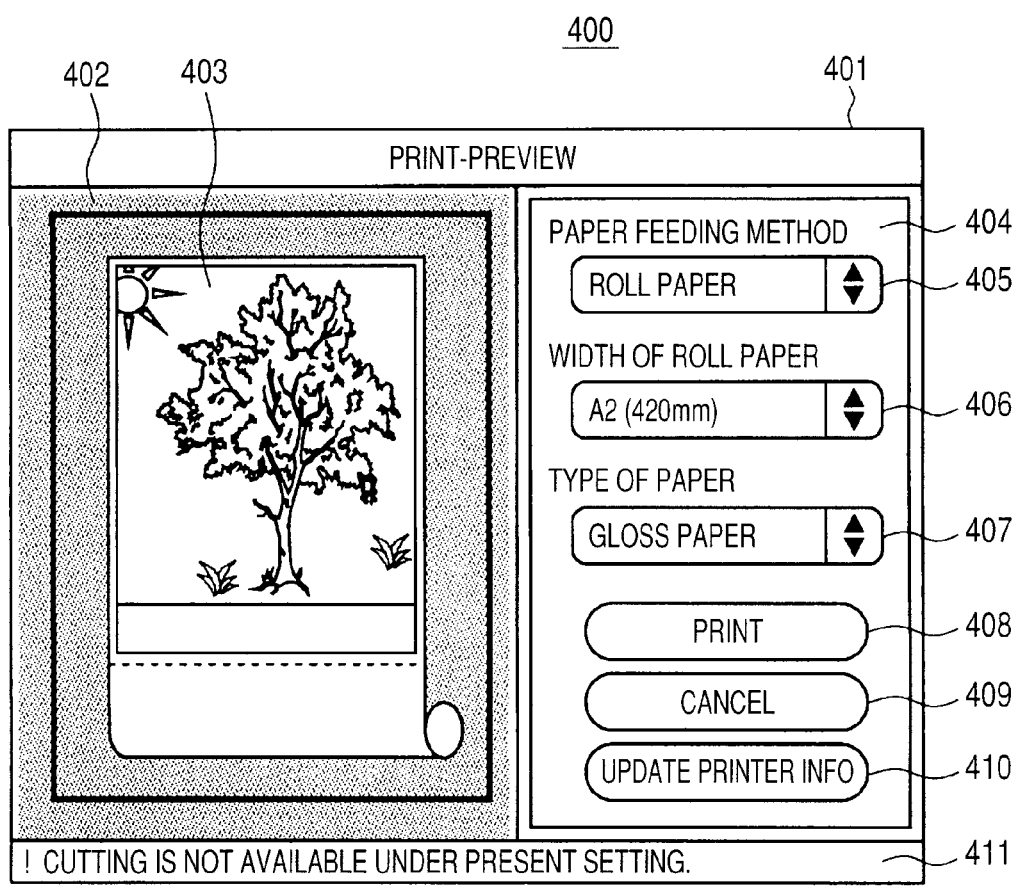
FIG. 7 is a diagram illustrating the user interface 400 of the print-preview.

FIG. 7 is a diagram illustrating the user interface 400 for the print-preview which is displayed in S207.

A lower side of the original image illustrates that there is a blank between the image which is printed and the cutting position because the margin at the foot edge was changed. A message showing that the automatic cutting is not executed after printing is displayed in the area 411, thereby notifying the user of such a fact.

When the button 411 is pressed in this display, processes in S203 and subsequent steps are executed and the present print setting and the display of the print-preview are updated.

According to the embodiment as described above, such a situation that the printing based on the improper print setting is executed can be prevented. After the user previously confirmed the proper print setting (alternative setting) and the print-preview based on it, the printing can be executed. Therefore, such a situation that the printing which is not intended by the user is executed can be prevented. Particularly, since the print setting is based on a situation such as a temperature or humidity which changes dynamically and a fact based on a situation which is difficult for the user to recognize is notified or reflected to the print setting, its effect is large.

In the foregoing embodiment, after the printer 2 determined the alternative setting as mentioned above, the printing based on the alternative setting may be executed without notifying the host apparatus 1 of it.

Although the improper print setting has been determined based on the temperature and/or humidity in the foregoing example, it may be determined based on other environment information.

Although the alternative setting has been determined in the printer 2 in the foregoing example, the host apparatus 1 may acquire the information of the temperature and humidity detected by the thermo-hygro sensor 810 from the printer 2 and decide the alternative setting. In this case, the host apparatus 1 becomes the print control apparatus.

The invention is also realized by executing the following processes: that is, such processes that software (program) for realizing the functions of the embodiment mentioned above is supplied to a system or apparatus through a network or various kinds of storage media and a computer (or a CPU, an MPU, or the like) of the system or apparatus reads out and executes the program. The program which is executed by the host apparatus 1 or printer 2 may be executed by one CPU or may be executed by a plurality of CPUs in an interlocking relational manner. The software and hardware may be properly combined and allowed to execute the processes. A CPU of an apparatus provided out of the host apparatus 1 or printer 2 may execute the program in place of executing it by the CPU in the host apparatus 1 or printer 2.

The invention is not limited to the foregoing embodiments but various modifications (including a combination of a plurality of embodiments) are possible based on the spirit of the invention and they are not excluded from the scope of the invention.

Although the various examples and embodiments of the invention have been described above, the spirit and scope of the invention are not limited to the specific description in the description.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-135335, filed Jun. 4, 2009, which is hereby incorporated by reference herein in its entirety.

What is claimed is:

1. A print control apparatus comprising:
   an acquiring unit configured to acquire information of a temperature and/or humidity detected by a detecting unit which is equipped in a printing apparatus and detects the temperature and/or humidity;
   a determining unit configured to determine a print setting adapted to execute a print job, wherein the print setting includes cutting information specifying whether a sheet is cut by a cutting unit for cutting an image-printed sheet based on the print job; and
   a judging unit configured to judge whether or not the cutting of the sheet by the cutting unit is available based on the information of the temperature and/or humidity acquired by the acquiring unit.

2. The apparatus according to claim 1, further comprising a deciding unit configured to decide changing the print setting such that the print setting of the automatic cutting is invalidated in a case where the judging unit judges the cutting of the sheet by the cutting unit is not available.

3. The apparatus according to claim 2, further comprising a notifying unit configured to notify the user of changing the print setting decided by the deciding unit.

4. The apparatus according to claim 2, further comprising a preview unit configured to preview an image based on the print job so that a content of the changing the print setting decided by the deciding unit can be recognized by a user.

5. The apparatus according to claim 1, wherein the judging unit judges whether or not the printing apparatus can execute the print job according to the print setting determined by the determining unit based on the information of the temperature and/or humidity acquired by the acquiring unit.

6. The apparatus according to claim 5, further comprising a deciding unit configured to decide an alternative setting of the print setting determined by the determining unit if it is judged by the judging unit that the print job cannot be executed.

7. The apparatus according to claim 6, further comprising a notifying unit configured to notify the user of the alternative setting decided by the deciding unit.

8. The apparatus according to claim 6, further comprising a preview unit configured to preview an image based on the print job so that the alternative setting decided by the deciding unit can be identified.

9. A print control method comprising:
acquiring information of a temperature and/or humidity detected by a detecting unit which is equipped in a printing apparatus and detects the temperature and/or humidity;
determining a print setting adapted to execute a print job, wherein the print setting includes cutting information specifying whether a sheet is cut by a cutting unit for cutting an image-printed sheet based on the print job; and
judging whether or not the cutting of the sheet by the cutting unit is available based on the acquired information of the temperature and/or humidity.

10. The method according to claim 9, further comprising judging whether or not the printing apparatus can execute the print job according to the determined print setting based on the information of the acquired temperature and/or humidity.

11. The method according to claim 10, further comprising deciding an alternative setting of the print setting if it is judged that the print job cannot be executed.

12. The method according to claim 11, further comprising notifying the user of the decided alternative setting.

13. The method according to claim 11, further comprising previewing an image based on the print job so that the decided alternative setting can be identified.

14. A non-transitory computer-readable recording medium which stores a program that can be executed by the computer, wherein the program comprises:

acquiring information of a temperature and/or humidity detected by a detecting unit which is equipped in a printing apparatus and detects the temperature and/or humidity;
determining a print setting adapted to execute a print job, wherein the print setting includes cutting information specifying whether a sheet is cut by a cutting unit for cutting an image-printed sheet based on the print job; and
judging whether or not the cutting of the sheet by the cutting unit is available based on the acquired information of the temperature and/or humidity.

15. The medium according to claim 14, further comprising judging whether or not the printing apparatus can execute the print job according to the determined print setting based on the information of the acquired temperature and/or humidity.

16. The medium according to claim 15, further comprising deciding an alternative setting of the print setting if it is judged that the print job cannot be executed.

17. The medium according to claim 16, further comprising notifying the user of the decided alternative setting.

18. The medium according to claim 16, further comprising previewing an image based on the print job so that the decided alternative setting can be identified.

* * * * *